(12) United States Patent
Ledvina et al.

(10) Patent No.: US 7,803,080 B2
(45) Date of Patent: Sep. 28, 2010

(54) HIGH STRENGTH AND STIFFNESS SILENT CHAIN WITH IMPROVED NOISE

(75) Inventors: Timothy J. Ledvina, Groton, NY (US); D. Laurence Parks, Waverly, NY (US); Shawn McGrogan, Watkins Glen, NY (US); Wes Park, Ithaca, NY (US)

(73) Assignee: BorgWarner Inc., Auburn Hills, MI (US)

( * ) Notice: Subject to any disclaimer, the term of this patent is extended or adjusted under 35 U.S.C. 154(b) by 576 days.

(21) Appl. No.: 11/610,232

(22) Filed: Dec. 13, 2006

(65) Prior Publication Data

US 2007/0155564 A1 Jul. 5, 2007

Related U.S. Application Data

(60) Provisional application No. 60/749,831, filed on Dec. 13, 2005, provisional application No. 60/827,731, filed on Oct. 2, 2006.

(51) Int. Cl.
*F16G 13/02* (2006.01)
*F16G 13/04* (2006.01)

(52) U.S. Cl. .................... 474/215; 474/212; 474/206

(58) Field of Classification Search .......... 474/212–215
See application file for complete search history.

(56) References Cited

U.S. PATENT DOCUMENTS

| | | | |
|---|---|---|---|
| 1,140,319 A | 5/1915 | Van Houten | |
| 5,236,400 A | 8/1993 | Tsuyama | |
| 5,267,910 A | 12/1993 | Maruyama et al. | |
| 5,453,059 A * | 9/1995 | Avramidis et al. | 474/212 |
| 5,628,702 A | 5/1997 | Kotera | |
| 6,159,122 A | 12/2000 | Kanehira et al. | |
| 6,244,983 B1 | 6/2001 | Matsuda | |
| 6,325,735 B1 | 12/2001 | Kanehira et al. | |
| 6,334,828 B1 | 1/2002 | Suzuki | |
| 6,461,263 B2 | 10/2002 | Suzuki et al. | |
| 6,663,522 B2 | 12/2003 | Horie | |
| 6,676,552 B2 * | 1/2004 | Scheufele et al. | 474/215 |
| 6,796,920 B2 | 9/2004 | Horie et al. | |
| 2004/0097314 A1 * | 5/2004 | Kotera | 474/213 |

FOREIGN PATENT DOCUMENTS

EP 1281890 2/2003

(Continued)

*Primary Examiner*—John Q Nguyen
*Assistant Examiner*—Henry Liu
(74) *Attorney, Agent, or Firm*—Brown & Michaels, PC

(57) ABSTRACT

An improved link for a chain for use with a sprocket, the link comprising a body having a pair of apertures for receiving connecting pins and a pair of teeth having outside flanks, and inside flanks between the teeth defining a crotch. The improvement includes an effective outer flank angle between a line tangent to the outer flank of the link at 1.5 P and a vertical line intersecting the tangent line of less than or equal to 29 degrees, an effective inner flank angle between a line tangent to the inner flank of the link at 0.5 P and a vertical line intersecting the tangent line of less than or equal to 29 degrees, and a plurality ratios. The links may be assembled into a chain and connected by a plurality of pins.

41 Claims, 11 Drawing Sheets

FOREIGN PATENT DOCUMENTS

| | | |
|---|---|---|
| GB | 2358230 | 7/2001 |
| GB | 2367109 | 3/2002 |
| JP | 60-164042 | 8/1985 |
| JP | 2001-304358 | 11/2001 |
| JP | 2003-049928 | 2/2003 |
| JP | 2003-202056 | 7/2003 |
| JP | 2004-116632 | 4/2004 |

* cited by examiner

HIGH STRENGTH AND STIFFNESS SILENT CHAIN WITH IMPROVED NOISE

REFERENCE TO RELATED APPLICATIONS

This application claims an invention which was disclosed in Provisional Application No. 60/749,831, filed Dec. 13, 2005 entitled "HIGH STRENGTH AND STIFFNESS SILENT CHAIN WITH IMPROVED NOISE" and in Provisional Application No. 60/827,731, filed Oct. 2, 2006 entitled "HIGH STRENGTH AND STIFFNESS SILENT CHAIN WITH IMPROVED NOISE". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of silent chains. More particularly, the invention pertains to a silent chain with increased strength and stiffness.

2. Description of Related Art

Silent chains or inverted tooth chains have been used for many years for power transmission applications, especially in automotive powertrains. In automatic transmissions, inverted tooth power transmission chains can be found as input drives between the torque converter and input gear set, or as an output drive between the output gear and the final drive. Inverted tooth chains can also be found in transfer case applications between the input of the transfer case and the output shaft to the front axle. A special class of inverted tooth chain that uses pin and rocker joints to achieve articulation of the chain joint are used where very low losses are required from friction and wear. Most conventional inverted tooth chains use a simple round pin fitted to a round hole in the link to articulate the chain by the link sliding on the round pin. This sliding produces greater friction than the pin and rocker design mentioned above where the pin and rocker can roll on one another.

Inverted tooth chain is limited in the tension that it can transmit, either through metal fatigue of the chain links causing the chain to fail, or by the chain jumping teeth on a sprocket which causes a momentary loss of the ability to transmit tension between the two sprockets. As the chain wears, slack is built up in the drive which reduces the ability of the chain to transmit tension without jumping teeth. A successful chain design balances fatigue strength, the ability to resist tooth jump, chain wear and operating noise level. In trying to improve one characteristic, another one is often compromised.

At the same time, vehicle manufacturers are fitting transmissions with more gears to their vehicles to improve performance as well as reduce fuel consumption. The wider overall transmission ratio increases the chain tensions and makes tooth jump by the chain more likely to occur under severe maneuvers. This is heightened by application of brake traction control to prevent the wheels from spinning, which relieves overload conditions from occurring within the drivetrain. At the same time, the wider ratio transmissions reduce engine speed during highway cruising which improves fuel economy. The lower engine speed reduces the masking noise making chain noise more audible in the passenger compartment of the vehicle. The result is the need for an improved chain that provides significantly better tooth jump resistance while still providing low friction losses in operation along with lower operating noise when used as an output drive in an automatic transmission or as a transfer drive in a transfer case.

Power transmission chains of the inverted tooth design for automotive use have relied on a link profile with an included angle of the outer flanks of 60 degrees. This produces an angle of 30 degrees to a vertical line intersecting the chain flank. Initially the chains were designed to engage the sprockets on the outside flanks of the links and seat on the sprocket teeth on the outside flanks. Traditional silent chains used for timing chain applications have been designed to engage the sprocket teeth on the inner flank of the links but transitioned to the outside flanks as they fully articulated to wrap the sprockets. Most of these designs had an included angle of the outer flanks of 60 degrees although some silent chains used an included angle of 55 degrees.

These silent chains achieved a low operating noise level by having a long active flank for gradual engagement with the sprocket. This required a high crotch above the pitch line of the links. The result was a relatively weak link, since tension applied to the links through the apertures resulted in a high bending stress in the crotch of the links.

Attempts have been made to improve the chain strength by dropping the crotch of the links in respect to the pitch line of the chain to reduce the bending stress for a given applied tension. However, as the crotch was dropped, the length of active flank available for engagement with the sprocket was reduced. This resulted in an increase in noise during operation of the chain. This also resulted in shorter sprocket teeth which reduced the resistance of the chain to jumping teeth under certain operating conditions.

Prior art silent chains have limited strength, stiffness, and small jump torque values due to link design features, including but not limited to crotch height, included angle, and effective flank angle. There have been some attempts to decrease the included angle, effective flank angle, and the crotch height, however while this resulted in increased strength, it also resulted in a significant increase in undesired chain noise. Another problem with silent chains is wear on both the chain and the sprocket.

U.S. Pat. No. 5,236,400 discloses a silent chain where the engaging surface angles of the link plates are varied, with irregular links having different interengaging surface links in reference to a standard link plate being irregularly arranged in the longitudinal direction of the chain. The engaging location of the link plates with the engaging surface of the involuted sprocket teeth are dispersed over an entire region of the engaging surfaces of the sprocket teeth, to avoid a concentration of wearing at one specific location. The engaging position of the irregular links is not concentrated at a specific location, but instead the engaging surface angles of the link are made different. The irregular shaped link has an engaging surface angle of ($\alpha+\Delta\alpha$), which is larger than the engaging angle $\alpha$ of the standard link. The included angle for the standard link is 60 degrees and the included angle of the irregular links is 80 degrees. The flank angle for the standard link is 30 degrees and the flank angle of the irregular links is 40 degrees.

U.S. Pat. No. 5,267,910 discloses a silent chain where each of the link plates has meshing surfaces adapted to engage the teeth of a sprocket at a pitch line. The majority of the link plates have a modified tooth profile in the form of a continuous curved surface composed of a concave circular arc having a radius of curvature, where the convex arc is positioned to interfere slightly with the sprocket teeth which it engages. The center of curvature of the convex arc is situated on the dedendum side of the pitch link relative to the chain. The included angle is 60 degrees and the flank angle is 30 degrees.

U.S. Pat. No. 6,244,983 discloses links of a silent chain that engage sprocket teeth on their inside flanks during initial engagement and full engagement. The sprocket teeth have a flank shape with a first part that matches the lower portion of the shape of the inside flank of the link tooth and a sprocket tooth flank shape with a second part that matches the upper part of the link tooth shape.

U.S. Pat. No. 6,334,828 discloses link plate teeth with inner and outer flanks profiled to satisfy the expression $H_i=H_o+H_s$, where $H_i$ is the distance from the chain pitch line to an inner flank pitch line, $H_o$ is the distance from the chain pitch line to the outer flank pitch line, and $H_s$, is the amplitude of polygonal motion of the chain. The included angle of the links is 60 degrees. In prior art FIG. 5 of U.S. Pat. No. 6,334,828, $H_i$ is less than or equal to $H_o$. The included angle of the prior art link is 65 degrees. The flank angle of the prior art link is 32.5 degrees.

Another problem with prior art links results from attempts to increase the strength of the links with an included angle of sixty degrees or a flank angle of thirty degrees while simultaneously reducing the crotch height. While the strength of the chain and the resulting stiffness has increased, the combination of the two above alterations have resulted in the generation of chain noise at an unacceptable level. Other prior art links attempt to vary the point of contact with the sprocket teeth on the link to reduce noise, but compromise by having the crotch so high that the apex of the crotch is either equal to or above the bottom of the pin apertures, decreasing the strength, stiffness, and tooth jump torque.

Similarly, U.S. Pat. No. 6,796,920 discloses the expression $H_i=H_o+H_s$, where $H_i$ is the distance from a pin center line to a pitch line of the inside tooth faces, $H_o$ is a distance from the pin center line to a pitch line of the outside tooth faces, and $H_s$ is the amplitude of polygonal motion of the chain. In prior art FIG. 7 of U.S. Pat. No. 6,796,920, the link plate has a crotch that is higher than the bottom of the pin apertures and has an included angle of 56 degrees. The flank angle of the link is 28 degrees.

JP Patent Application No. 60-164042 discloses a silent chain with three different types of link plates. Each of the links have a different pressure angle and are irregularly arranged along the chain to prevent improper tooth mesh due to tooth jumping. The crotch of the links are equal or higher than the bottom of the pin apertures. The included angles of the links are 55 degrees, 75 degrees, and 85 degrees. The flank angles of the links are 27.5 degrees, 37.5 degrees, and 42.5 degrees respectively.

FIG. 1 shows a prior art link 100 that contacts and seats on a sprocket on the outer flank 104 of the link. The link has a pair of pin apertures 102 for receiving connecting pins comprised of a rocker pin 107 and a second pin 108 and a pair of teeth 105. The teeth 105 have outside flanks 104 and inside flanks 106 that form the crotch 103 of the link. The pitch (P) of the link is the average distance between the joints or apertures 102 of the link when it is in an assembled chain. The pitch line is defined as the pin and rocker contact point when the link is assembled in a chain that is in a straight line approaching a sprocket. A variable K shows the measured distance between the pitch line and a line which contacts the outside flank at 1.5*Pitch (1.5 P). Variable H is the measured distance below the pitch line to the apex of the crotch 103 of the link. A variable T shows the measured distance from the pitch line down to the tip of the tooth on the link, shown as the toe 105 of the link.

On the outer flanks 104 of the link, $F_o$ shows the contact area on the outer flank 104 in which the link 100 contacts or seats on a sprocket tooth. The effective outer flank angle $\Delta$ is defined as the angle formed by a line tangent to the outer flank of the link at the 1.5 P line and a vertical line intersecting the tangent line. The prior art link 100 has an effective outer flank angle $\Delta$ of thirty degrees.

If the link has only a single round pin (not a rocker pin), the pitch line for the chain would pass through the center of the single round pin.

FIG. 2 shows a prior art link 110 that contacts the sprocket on inside flank 116 of the link and seats on the outer flank 114 of the link. The link has a pair of pin apertures 112 for connecting pins comprised of a rocker pin 117 and a second pin 118 and a pair of teeth 115. The teeth 115 have outside flanks 114 and inside flanks 116 that form the crotch 113 of the link. The pitch (P) of the link is the distance between the contact points of the rocker pin 117 and the second pin 118 forming the rocker joint in apertures 112 of the link, in an assembled chain. The pitch line is defined as the line passing through pin and rocker contact point when the link is assembled in a chain that is in a straight line. A variable K shows the measured distance between the pitch line and a line which contacts the outer flank at 1.5*Pitch (1.5 P). The prior art link 110 has an effective outer flank angle $\Delta$ of thirty degrees. The effective outer flank angle $\Delta$ is defined as the angle formed by a line tangent to the outer flank of the link at the 1.5 P line and a vertical line intersecting the tangent line.

A variable L shows the measured distance between the pitch line and a line which contacts the inner flank at 0.5*Pitch (0.5 P). Variable H is the measured distance below the pitch line to the apex of the crotch 113 of the link. A variable T shows the measured distance from the pitch line down to the tip of the tooth on the link, shown as the toe 115 of the link.

On the inner flanks 116 of the link, $F_i$ shows the contact area on the inner link flank 116 in which the link 110 contacts a sprocket tooth. The effective inner flank angle $\phi$ is defined as the angle formed by a line tangent to a radius, forming the inside flank 116 and whose center is located outside the periphery of the link, at the contact point of the radius to a horizontal line spaced 0.5*P from one inside flank 116 to the other inside flank and a vertical line intersecting the tangent line. The prior art link 110 has an effective inner flank angle $\phi$ of thirty degrees.

Therefore, there is a need in the art for a new chain that has enhanced resistance to tooth jump that still provides low noise level in operation with enhanced fatigue strength with links that have increased strength, a low crotch, and small effective flank angle.

SUMMARY OF THE INVENTION

An improved link for a chain for use with a sprocket, the link comprising a body having a pair of apertures for receiving connecting pins, with the apertures being spaced apart by a pitch distance, and having a pitch line passing through the apertures and a pair of teeth having outside flanks, and inside flanks between the teeth defining a crotch. The links may be formed to drivingly contact sprocket teeth of a sprocket on the inner flanks of the link or the outer flanks of the link. The improvements include an effective outer flank angle between a line tangent to the outer flank of the link at 1.5 P and a vertical line intersecting the tangent line of less than or equal to 29 degrees, an effective inner flank angle between a line tangent to the inner flank of the link at 0.5 P and a vertical line intersecting the tangent line of less than or equal to 29 degrees, and a plurality ratios.

The links may be assembled into a chain and connected by a plurality of pins. The pins are preferably pairs of rocker pins and second pins known as rockers that are designed to rock on the rocker pins.

The outer flanks of the links may be straight, curved with a large radius of curvature, or curved with a small radius of curvature below the 1.5 P line.

The inner flanks may be straight, curved with a large radius of curvature, or curved with a small radius of curvature below the 0.5 P line.

DETAILED DESCRIPTION OF THE INVENTION

Figure 1:
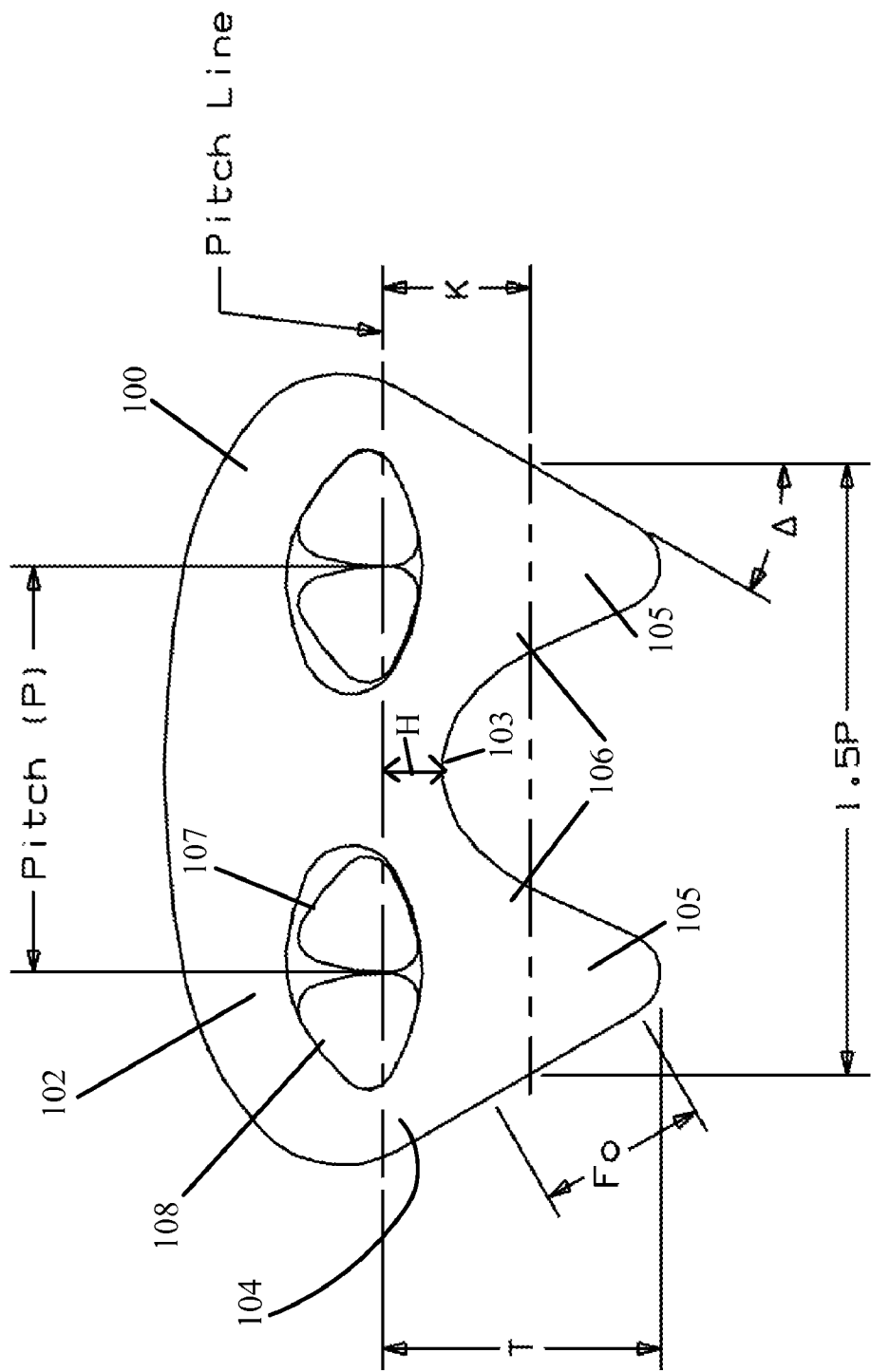
FIG. 1 shows a prior art link that contacts the sprocket on the outside flank of the link.

In the attached drawings corresponding elements are identified by the same reference numerals.

A silent chain is formed of rows or sets of interleaved links. Each link has a pair of pin apertures and teeth. Connecting pins, preferably comprised of a rocker pin and a second pin are inserted into the pin apertures, connecting the interleaved links in a width direction. When a chain is wound around a sprocket, the contact of the links with the sprocket teeth may be with the flank of the link or the crotch of the link.

In this application, "driving contact" whether on the inner flank/crotch or the outer flank of the link refers to the link being primarily driven through that part of the link by the sprocket and does not exclude contact that may occur on the other flanks of the link. For example, on some sprockets, the links have driving contact on the inner flank or crotch of the link and may then seat on either the outer flank or inner flank depending on the number of teeth. One link may also have driving contact on the inner flank that transitions to driving contact on the outer flank of the preceding link once the angle of articulation between the two links becomes great enough, again depending on the number of teeth on the sprocket as the chain engages the driving sprocket.

Figure 3:
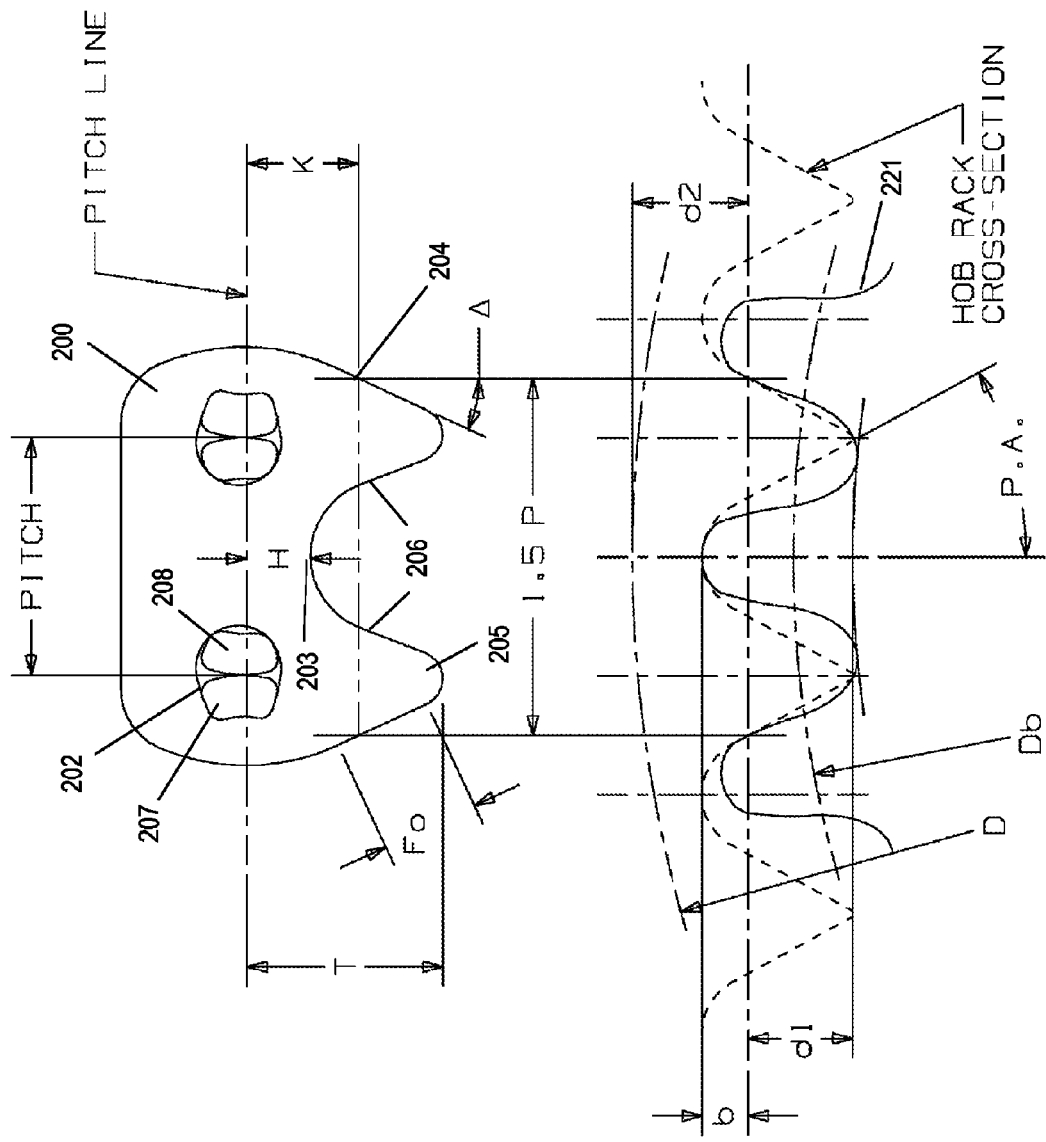
FIG. 3 shows a link of a first embodiment that contacts the sprocket on the outside flank of the link and has straight outer flanks.

FIG. 3 shows a link 200 of the first embodiment and a portion of the corresponding sprocket teeth 221. Link 200 is formed to drivingly contact the sprocket teeth 221 on the outer flank 204 and seat on the sprocket teeth 221 on the outer flank 204 of the link. The link 200 has a pair of pin apertures 202 for receiving connecting pins comprised of a rocker pin 207 and a second pin 208 and a pair of teeth 205. The teeth 205 have outside flanks 204 and inside flanks 206 that form the crotch 203 of the link. The pitch or pitch distance (P) of the link is the average distance between the contact points of the rocker joints in an assembled chain. The pitch line is defined as a line passing through the pin and rocker contact points when the link is assembled in a chain that is in a straight line. Variable K measures the distance between the pitch line and a line which contacts the outer flank at 1.5*Pitch (1.5 P). Variable H is the measured distance below the pitch line to the apex of the crotch 203 of the link. Variable T is the measured distance below the pitch line to the ends of the teeth of the links. A variable L (FIG. 4) shows the measured distance between the pitch line and a line which contacts the inner flank at 0.5*Pitch (0.5 P).

The effective outer flank angle $\Delta$ is defined as the angle formed by a line tangent to the outer flank of the link at the 1.5 P line and a vertical line intersecting the tangent line. The link 200 has an effective outer flank angle $\Delta$ of less than or equal to 29 degrees. On the outer flanks 204 of the link, $F_o$ shows the contact area on the outer link flank in which the link contacts or seats on sprocket teeth 221.

The definitions as listed above apply to all symmetric link embodiments of the present application.

The link 200 is further defined by the inequality expressed in formula (1.1), K divided by the product of the pitch distance or pitch P and the tangent of the effective outer flank angle $\Delta$ is greater than or equal to 0.790.

$$\frac{K}{P \times (\tan\Delta)} \geq 0.790 \qquad (1.1)$$

For example, if the values for the pitch of the link is 0.375, the effective outer flank angle is 25°, and K is 0.176, were inserted into inequality formula (1.1), the value obtained is greater than or equal to 0.790.

$$\frac{0.176}{0.375 \times (\tan(25))} = 1.006$$

$$1.006 \geq 0.790$$

As the effective outer flank angle increases, as in the prior art, see FIG. 1, and the average values of prior art links as indicated in Table 1 below, the value of K decreases, and the results of the formula (1.1) do not satisfy the required inequality.

$$\frac{0.1511}{0.375 \times (\tan 30)} = 0.698$$

Therefore, 0.698 is not $\geq 0.790$

Link 200 is also defined by the inequality expressed in formula (1.2), the ratio of H (the distance below the pitch line to the apex of the crotch) to the pitch or pitch distance P is greater than 0.239.

$$\frac{H}{P} > 0.239 \quad (1.2)$$

For example, if the value for H was 0.095, and the pitch P was 0.375, $$\frac{0.095}{0.375} = 0.253$$

$$0.253 > 0.239$$

When the apex of the crotch is higher than the pitch line, a negative value or a value less than 0.239 for formula (1.2) will result. Using the average values from prior art links from the table below, 0.1991 is not greater than 0.239 and does not satisfy the required inequality.

Link 200 is further defined by the inequality expressed in formula (1.3), the ratio of T (the distance below the pitch line to the ends of the teeth 205) to the pitch or pitch distance P is greater than or equal to 0.770.

$$\frac{T}{P} \geq 0.770 \quad (1.3)$$

Using the average values from prior art links from the table below, 0.7357 is not greater than or equal to than 0.770 and does not satisfy the required inequality.

Link 200 may also be defined by the inequality expressed in formula (1.4), the product of the ratio H (the distance below the pitch line to the apex of the crotch) to the pitch or pitch distance P times the difference between the ratio of T (the distance below the pitch line to the ends of the teeth 205) to the pitch or pitch distance P and the ratio of H (the distance below the pitch line to the apex of the crotch) to the pitch or pitch distance P is greater than 0.124.

$$\left(\frac{T}{P} - \frac{H}{P}\right) \times \frac{H}{P} > 0.124 \quad (1.4)$$

Using the average values of prior art links as indicated in Table 1 below, $$(0.7357 - 0.1991) \times 0.1991 = 0.1068$$

0.1068 is not greater than 0.124.

Therefore the prior art links do not satisfy the required inequality expressed in formula (1.4).

Link 200 may be further defined by the inequality expressed in formula (1.5), the product of the ratio of K, measuring the distance between the pitch line and a line which contacts the outer flank at 1.5*Pitch (1.5 P), to the pitch distance P and the ratio of H, the distance below the pitch line to the apex of the crotch to the pitch or pitch distance P divided by the tangent of the effective outer flank angle is greater than 0.176.

$$\left(\frac{\frac{K}{P} * \frac{H}{P}}{\tan\Delta}\right) > 0.176 \quad (1.5)$$

Using the average values of prior art links as indicated in Table 1 below, $$\left(\frac{.4062 * .1991}{\tan(30.2)}\right) = 0.1390$$

0.1390 is not greater than 0.176

Therefore the prior art links do not satisfy the required inequality expressed in formula (1.5).

The numbers chosen for the examples relating to the present invention are arbitrary and the numbers do not necessarily correspond to the figures. The numbers for the prior art are average values for the corresponding rations of prior art production chains are present in Table 1 below and are present to add context.

Figure 4:
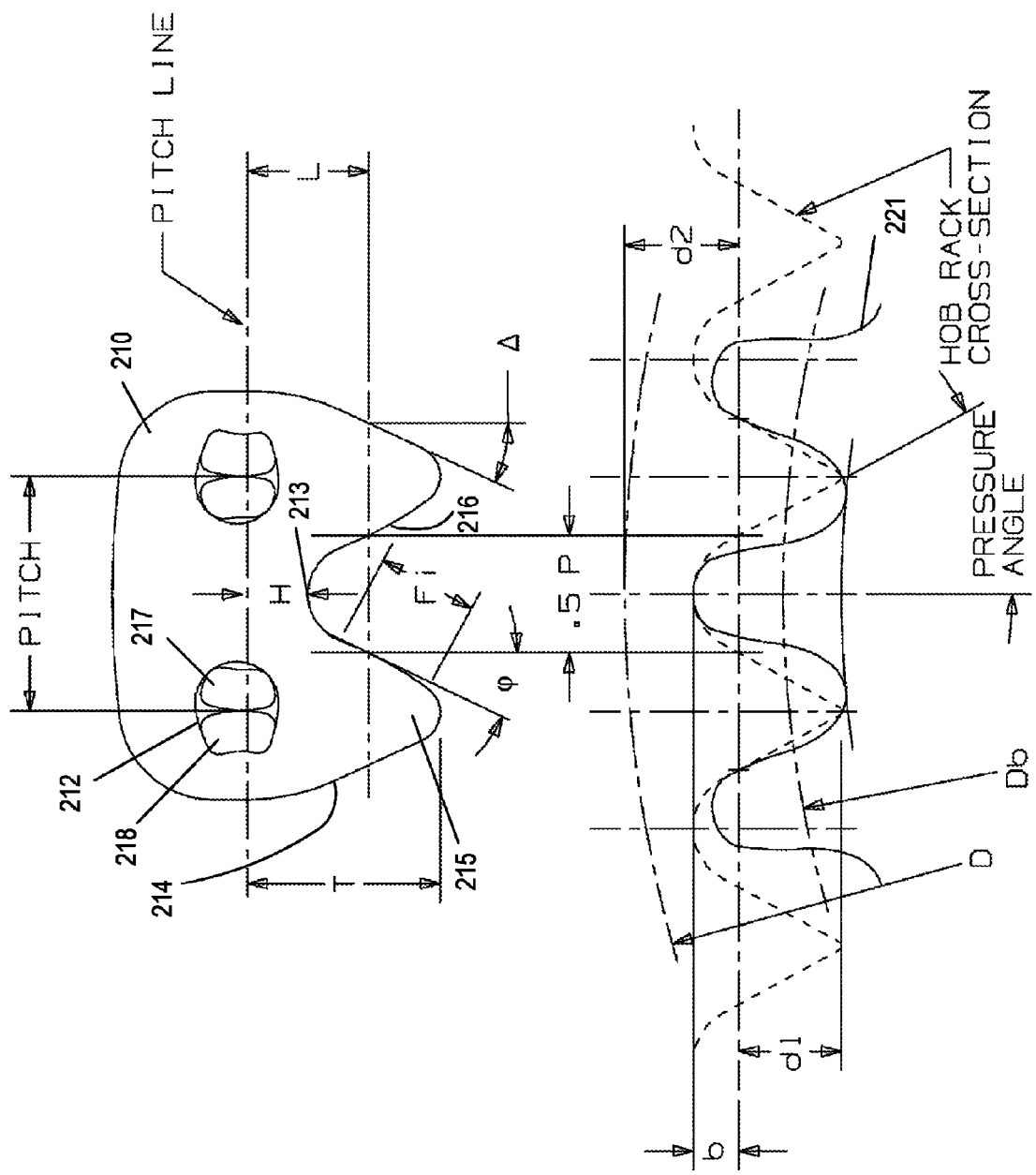
FIG. 4 shows a link of a second embodiment that contacts the sprocket on the inside flank of the link and has radiused or curved inner flanks.

FIG. 4 shows a link 210 of a second embodiment and a portion of the corresponding sprocket teeth 221. Link 210 is formed to drivingly contact the sprocket teeth 221 on the inner flank 216 or crotch 213 of the link and seat on the sprocket teeth 221 on the outer flank 214 of the link. The link 210 has a pair of pin apertures 212 for receiving connecting pins comprised of a rocker pin 217 and a second pin 218 and a pair of teeth 215. The teeth 215 have outside flanks 214 and inside flanks 216 that form the crotch 213 of the link. The link 210 has an effective outer flank angle Δ of less than or equal to 29 degrees.

A variable L shows the measured distance between the pitch line and a line which contacts the inner flank at 0.5*Pitch (0.5 P). Variable H is the measured distance below the pitch line to the apex of the crotch 213 of the link. Variable T is the measured distance below the pitch line to the ends of the teeth 215 of the links. On the inner flanks of the link, Fi shows the contact area on the inner link flank 216 in which the link contacts the sprocket teeth 221. The effective inner flank angle φ is defined as an angle formed by a line tangent to the radius forming the inside flank 216 and whose center is located outside the periphery of the link, at the contact point of the radius to a horizontal line spaced 0.25*P from a vertical centerline of the link 210 and a vertical line passing through the contact point. Link 210 has an effective inner flank angle φ of less than or equal to 29 degrees.

The link 210, which contacts the sprocket teeth on the crotch or inner flank of the link is further defined by the inequality expressed in formula (2.1), as L divided by the product of the pitch P and the tangent of the effective inner flank angle φ is greater than or equal to 0.850.

$$\frac{L}{P \times (\tan(\varphi))} \geq 0.850 \quad (2.1)$$

For example, if the values for the pitch of the links is 0.375, the effective inner flank angle is 26° for a link that contacts the sprocket teeth on crotch of the link, and L is 0.1900 were inserted into inequality formula (2.1), the value obtained is greater than or equal to 0.850, $$\frac{0.1900}{0.375 > (\tan(26))} = 1.039$$

$$1.039 \geq 0.850$$

Figure 2:
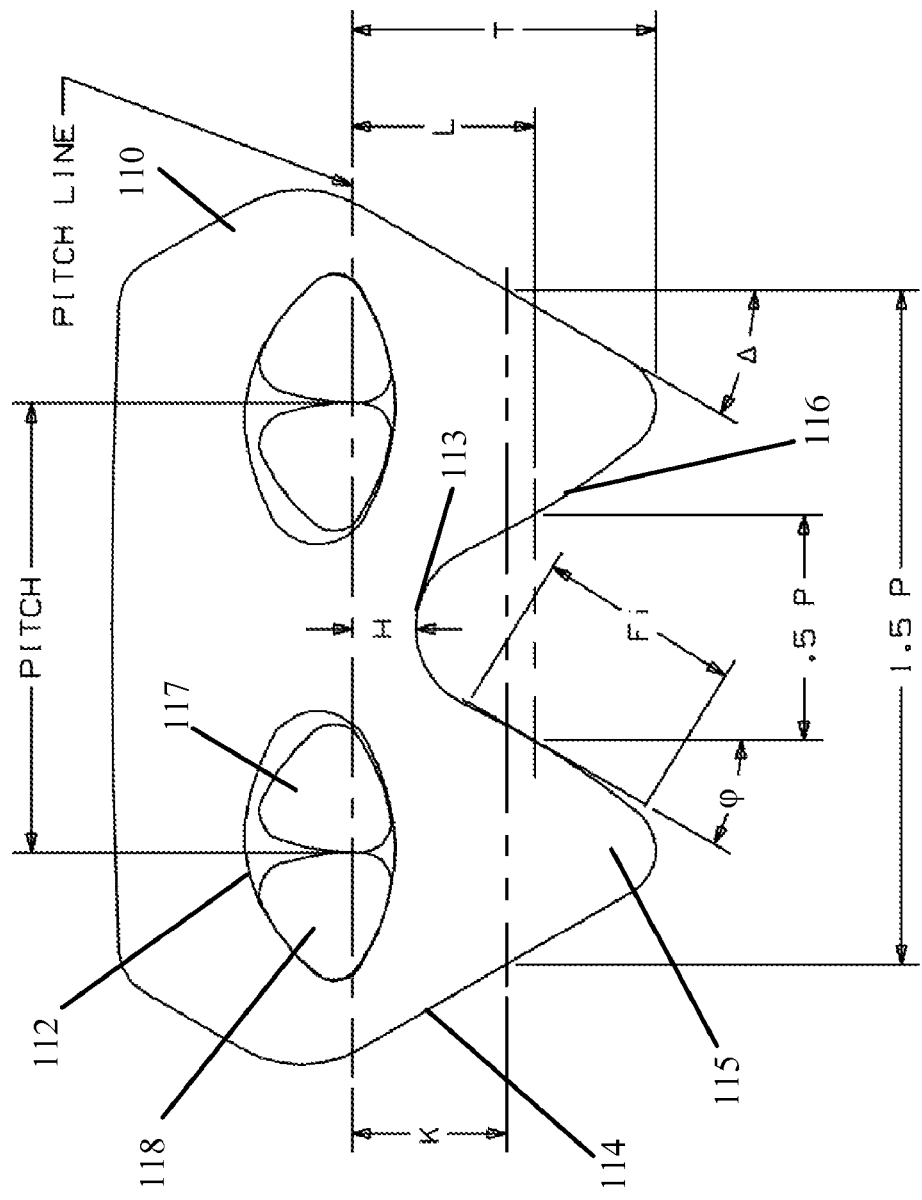
FIG. 2 shows a prior art link that contacts the sprocket on the inside flank of the link.

As the effective inner flank angle increases, as in the prior art, see FIG. 2, the value of L decreases, and the inequality (2.1) is not true. The prior art production links fail to satisfy the required inequality.

$$\frac{0.1677}{0.375 \times (\tan(30))} = 0.7747$$

Therefore, 0.7747 is not ≥ 0.850

Link 210 is also defined by the inequality expressed in formula (2.2), the ratio of the distance below the pitch line to the apex of the crotch H, divided by the pitch or pitch distance P is greater than 0.239.

$$\frac{H}{P} > 0.239 \qquad (2.2)$$

For example, if the values for H was 0.095, and the pitch was 0.375, $$\frac{0.095}{0.375} = 0.253$$

$$0.253 > 0.239$$

When the apex of the crotch is higher than the pitch line, a negative value or a value less than 0.239 for formula (2.2) will result. Using the average values from prior art links from the table below, 0.1991 is not greater than 0.239 and does not satisfy the required inequality.

Link 210 is further defined by the inequality expressed in formula (2.3), the ratio of T (the distance below the pitch line to the ends of the teeth 215) to the pitch P is greater than or equal to 0.770.

$$\frac{T}{P} \geq 0.770 \qquad (2.3)$$

Using the average values from prior art links from the table below, 0.7357 is not greater than or equal to than 0.770 and does not satisfy the required inequality.

Link 210 may also be defined by the inequality expressed in formula (2.4), the product of the ratio H (the distance below the pitch line to the apex of the crotch) to the pitch P times the difference between the ratio of T (the distance below the pitch line to the ends of the teeth 215) to the pitch P and the ratio of H (the distance below the pitch line to the apex of the crotch) to the pitch P is greater than 0.124.

$$\left(\frac{T}{P} - \frac{H}{P}\right) \times \frac{H}{P} > 0.124 \qquad (2.4)$$

Using the average values of prior art links as indicated in Table 1 below, the prior art production links do not satisfy the required inequality.

(0.7357−0.1991)×0.1991=0.1068

0.1068 is not greater than 0.124.

Therefore the prior art links do not satisfy the required inequality expressed in formula (2.4).

Link 210 is also defined by the inequality of expressed in formula (2.5), the product of the ratio H (the distance below the pitch line to the apex of the crotch) to the pitch P times the difference between the ratio of T (the distance below the pitch line to the ends of the teeth 215) to the pitch P and the ratio of H (the distance below the pitch line to the apex of the crotch) to the pitch P divided by the tangent of the effective inner flank angle φ is greater than 0.210.

$$\left(\frac{\left(\frac{T}{P} - \frac{H}{P}\right) * \frac{H}{P}}{\tan(\varphi)}\right) > 0.210 \qquad (2.5)$$

Using the average values of prior art links as indicated in Table 1 below, the prior art production links do not satisfy the required inequality.

$$\left(\frac{(0.7357 - 0.1991) * 0.1991}{\tan(31.03)}\right) = 0.185$$

0.178 is not greater than 0.210.

Therefore the prior art links do not satisfy the required inequality expressed in formula (2.5).

Link 210 is further defined by the inequality expressed in formula (2.6), as T, the distance below the pitch line to the ends of the teeth 215, divided by the product of the pitch P and the tangent of the effective inner flank angle φ is greater than or equal to 1.40.

$$\frac{T}{P \times (\tan(\varphi))} \geq 1.40 \qquad (2.6)$$

Using the average values of prior art links as indicated in Table 1 below, the prior art production links do not satisfy the required inequality.

$$\frac{.2766}{.375 \times (\tan(31.03))} = 1.2259$$

1.2259 is not greater than or equal to 1.40.

Link 210 may be further defined by the inequality expressed in formula (2.7), the product of the ratio of K, measuring the distance between the pitch line and a line which contacts the outer flank at 1.5*Pitch (1.5 P), to the pitch distance P and the ratio of H, the distance below the pitch line to the apex of the crotch to the pitch or pitch distance P divided by the tangent of the effective outer flank angle is greater than 0.176.

$$\left(\frac{\frac{K}{P} * \frac{H}{P}}{\tan\Delta}\right) > 0.176 \quad (2.7)$$

Using the average values of prior art links as indicated in Table 1 below, $$\left(\frac{.4062 * .1991}{\tan(30.2)}\right) = 0.1390$$

0.1390 is not greater than 0.176

Therefore the prior art links do not satisfy the required inequality expressed in formula (2.7).

The numbers chosen for the examples relating to the present invention are arbitrary and the numbers do not necessarily correspond to the figures. The numbers for the prior art are average values for the corresponding rations of prior art production chains are present in Table 1 below and are present to add context.

Figure 5:
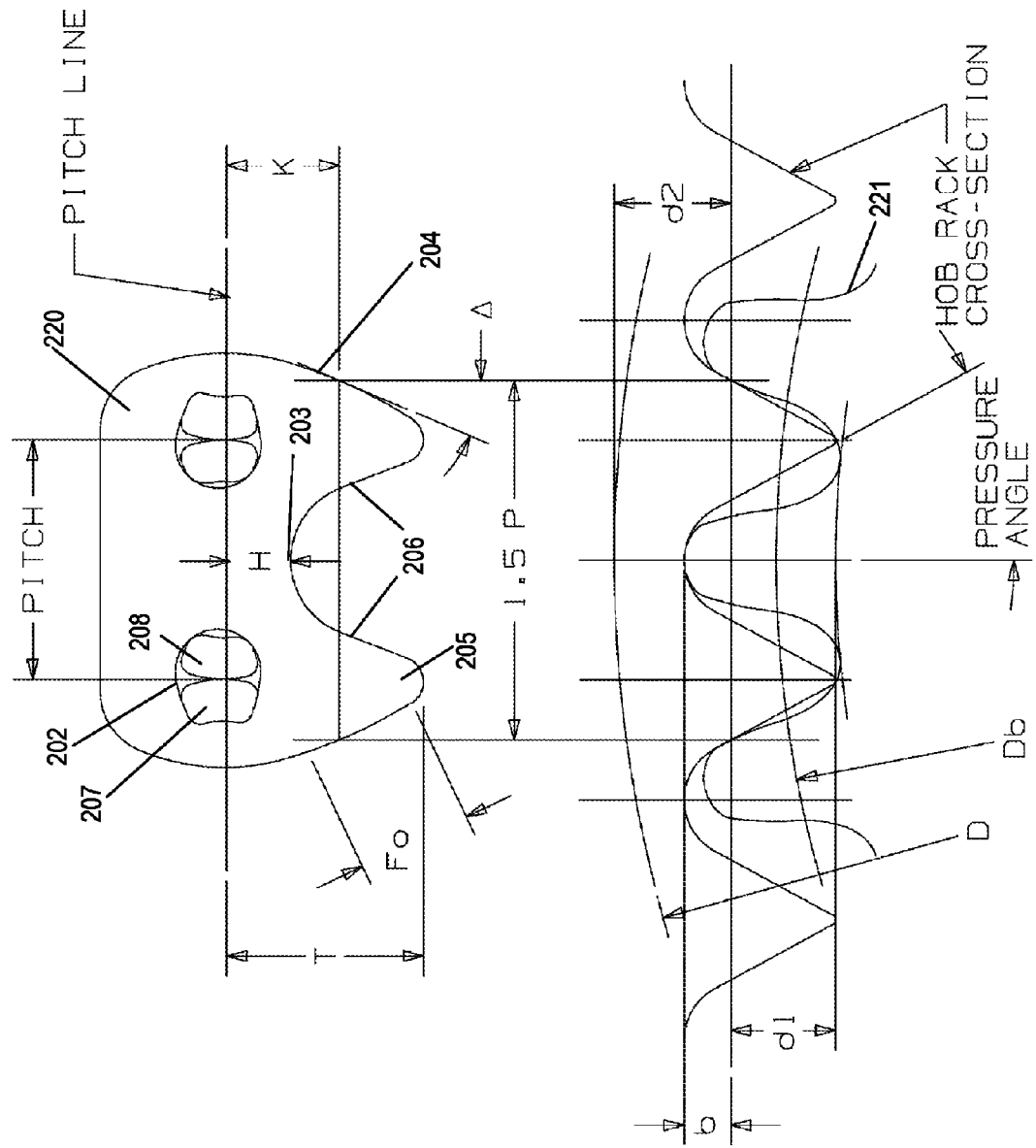
FIG. 5 shows a link of a third embodiment that contacts the sprocket on the outside flank of the link and has an outer flank with a large radius.

FIG. 5 shows a link 220 of a third embodiment in which the outer flank 204 is curved and has a large radius of curvature. Link 220 is formed to drivingly contact the sprocket teeth 221 on the outer flank 204 and seat on the sprocket teeth 221 on the outer flank 204 of the link. The link 220 has a pair of pin apertures 202 for receiving connecting pins comprised of a rocker pin 207 and a second pin 208 and a pair of teeth 205. The teeth 205 have outside flanks 204 and inside flanks 206 that form the crotch 203 of the link.

The link 220 has an effective outer flank angle Δ of twenty three degrees. On the outer flanks 204 of the link, Fo shows the contact area on the outer link flank in which the link drivingly contacts the sprocket teeth 221. The link may be further defined as described above and herein stated by reference by formulas 1.1, 1.2, 1.3, 1.4, 1.5, 2.1, 2.2, 2.3, 2.4, 2.5, 2.6 and 2.7.

Figure 6:
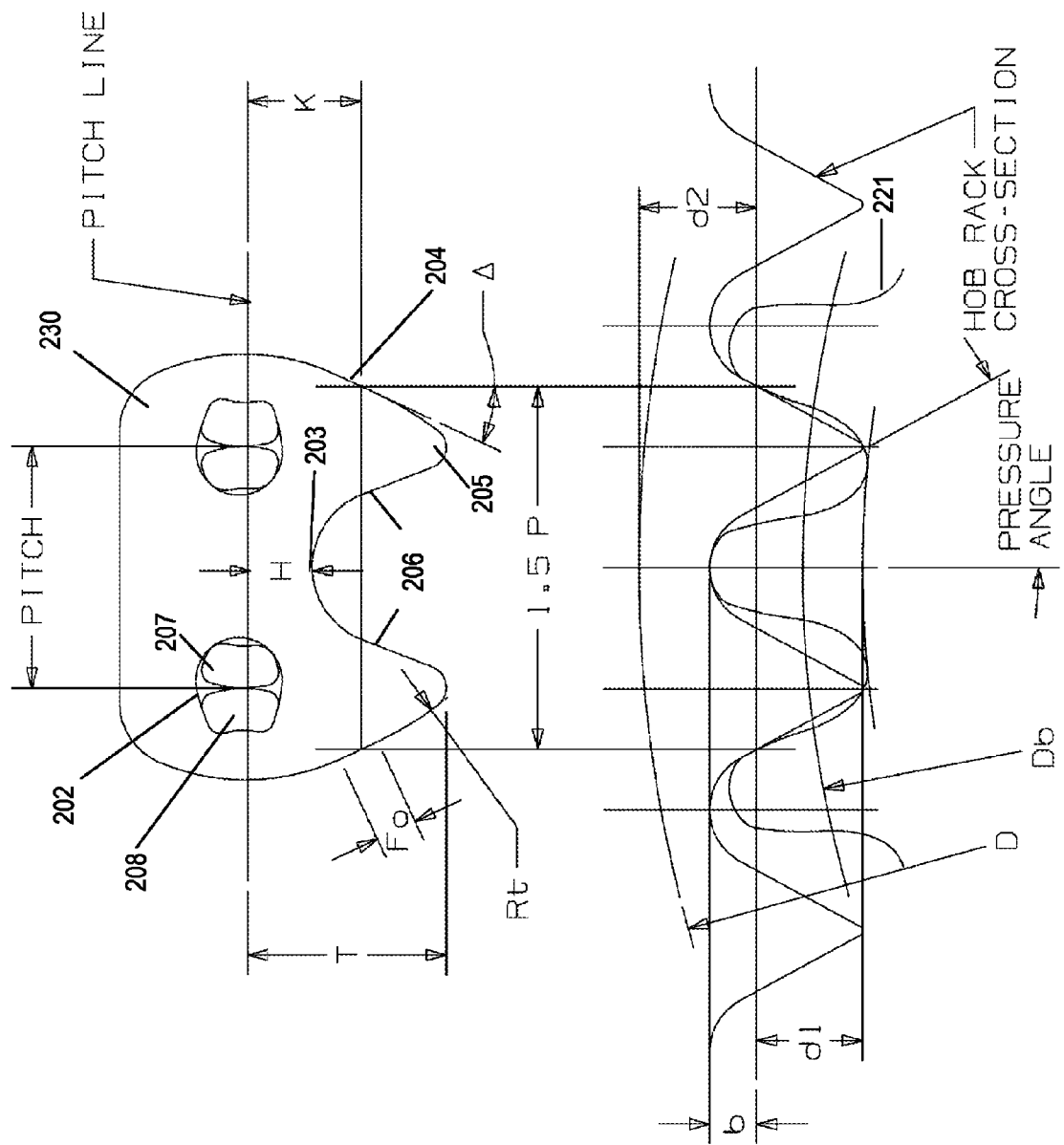
FIG. 6 shows a link of a fourth embodiment that contacts the sprocket on the outside flank of the link and has an outer flank with a small radius.

FIG. 6 shows a link 230 of a fourth embodiment in which the outer flank 204 is curved and has a small radius of curvature that is below the pitch line. The outer flank 204 also has toe relief Rt. Link 230 is formed to drivingly contact the sprocket teeth 221 on the outer flank 204 and seat on the sprocket teeth 221 on the outer flank 204 of the link. The link 230 has a pair of pin apertures 202 for receiving connecting pins comprised of a rocker pin 207 and a second pin 208 and a pair of teeth 205. The teeth 205 have outside flanks 204 and inside flanks 206 that form the crotch 203 of the link.

The link 230 has an effective outer flank angle Δ of twenty five degrees. On the outer flanks 204 of the link, Fo shows the contact area on the outer link flank in which the link drivingly contacts the sprocket teeth 221. The link may be further defined as described above and herein stated by reference by formulas 1.1, 1.2, 1.3, 1.4, 1.5, 2.1, 2.2, 2.3, 2.4, 2.5, 2.6 and 2.7.

Figure 7:
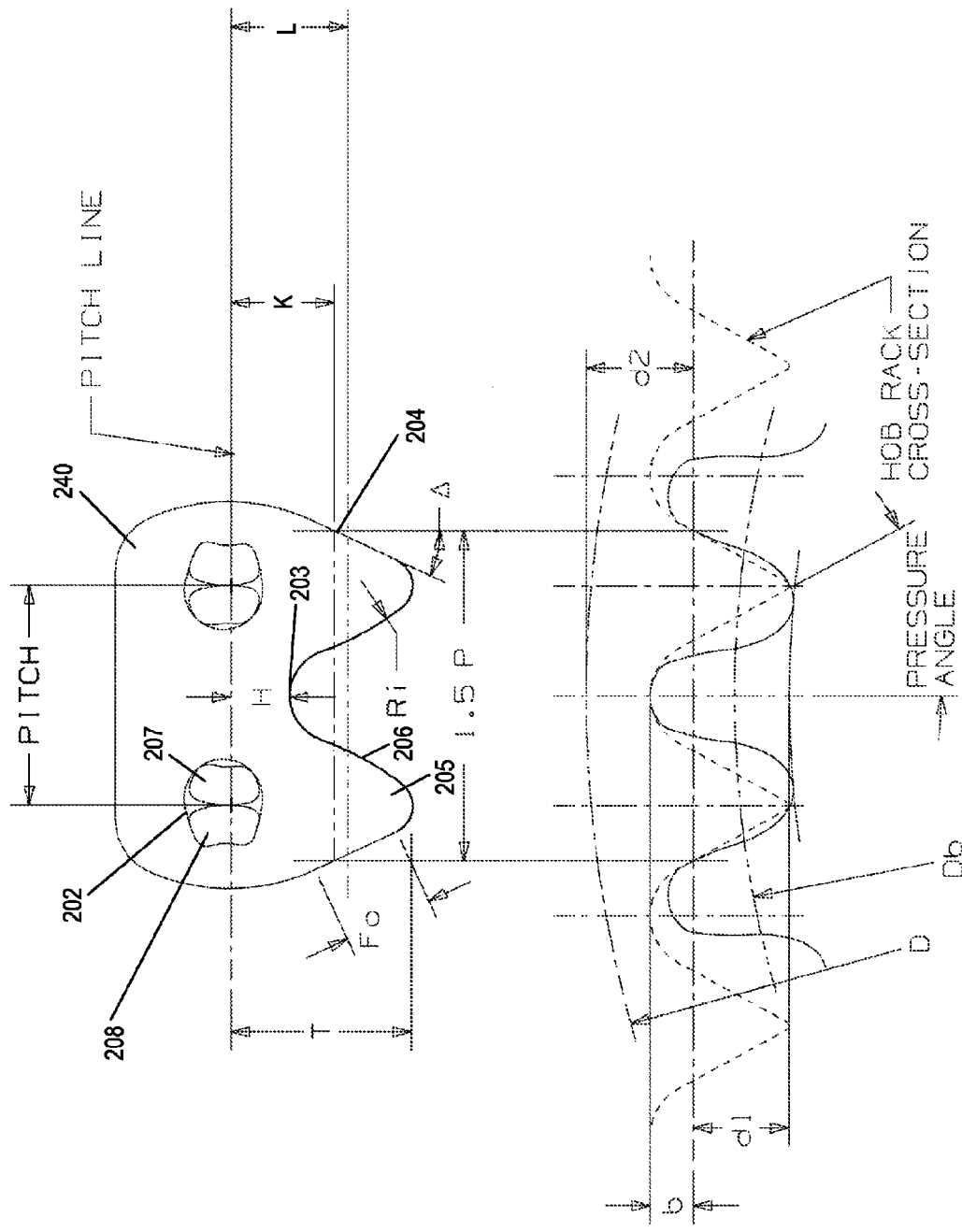
FIG. 7 shows a link of a fifth embodiment that contacts the sprocket on the inside flank of the link and has an inner flank with a radius of curvature below the 0.5 line.

FIG. 7 shows a link 240 of a fifth embodiment in which the inner flank 206 is curved and has a radius of curvature which is below the pitch line. The inner flank 206 also has tooth relief Ri. Link 240 is formed to drivingly contact the sprocket teeth 221 on the inner flank 206 and seat on the outer flank 204 of the link. On very large sprockets, link 240 may seat on the inner flank 206 depending on the angle of articulation required to wrap the sprocket. The link 240 has a pair of pin apertures 202 for receiving connecting pins comprised of a rocker pin 207 and a second pin 208 and a pair of teeth 205. The teeth 205 have outside flanks 204 and inside flanks 206 that form the crotch 203 of the link. The link 240 has an effective outer flank angle Δ of twenty five degrees. The inner flank angle φ is defined in a manner similar to link 210 in FIG. 4.

The link may be further defined as described above and herein stated by reference by formulas 1.1, 1.2, 1.3, 1.4, 1.5, 2.1, 2.2, 2.3, 2.4, 2.5, 2.6 and 2.7.

Figure 8:
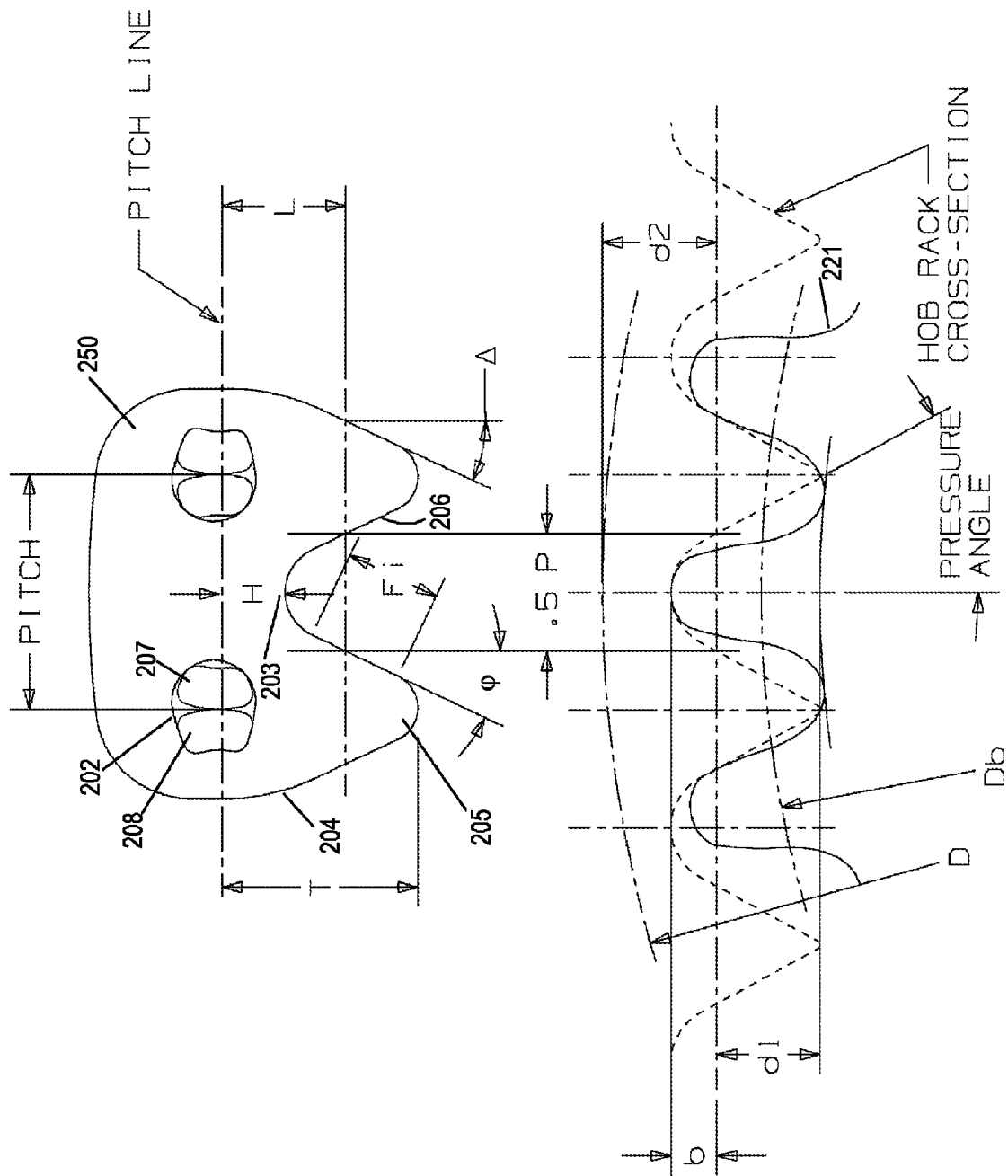
FIG. 8 shows a link of a sixth embodiment that contacts the sprocket on the inside flank of the link and has an inner flank that is straight.

FIG. 8 shows a link 250 of a sixth embodiment in which the inner flanks 206 of the links are straight. Link 250 is formed to drivingly contact the sprocket teeth 221 on the inner flank 206 and seat on the sprocket teeth 221 on the outer flank 204 of the link. As another embodiment, link 250 may be designated such that the link drivingly contacts the sprocket teeth 221 on the inside flank 206 and avoids seating on the outside flank 204. The link 250 has a pair of pin apertures 202 for receiving connecting pins comprised of a rocker pin 207 and a second pin 208 and a pair of teeth 205. The teeth 205 have outside flanks 204 and inside flanks 206 that form the crotch 203 of the link. The link 250 has an effective outer flank angle Δ of twenty five degrees.

A variable L shows the measured distance between the pitch line and a line which contacts the inner flank at 0.5*Pitch (0.5 P). Variable H is the measured distance below the pitch line to the apex of the crotch 203 of the link. Variable T is the measured distance below the pitch line to the ends of the teeth of the links. On the inner flanks of the link, Fi shows the contact area on the inner link flank 206 in which the link drivingly contacts the sprocket teeth 221. The inner flank angle (p, defined between the inner flank 206 and a vertical line passing through 0.5 P contact point is twenty six degrees. Link 250 has an effective inner flank angle φ of twenty six degrees. The link may be further defined as described above and herein stated by reference by formulas 1.1, 1.2, 1.3, 1.4, 1.5, 2.1, 2.2, 2.3, 2.4, 2.5, 2.6 and 2.7.

Figure 9:
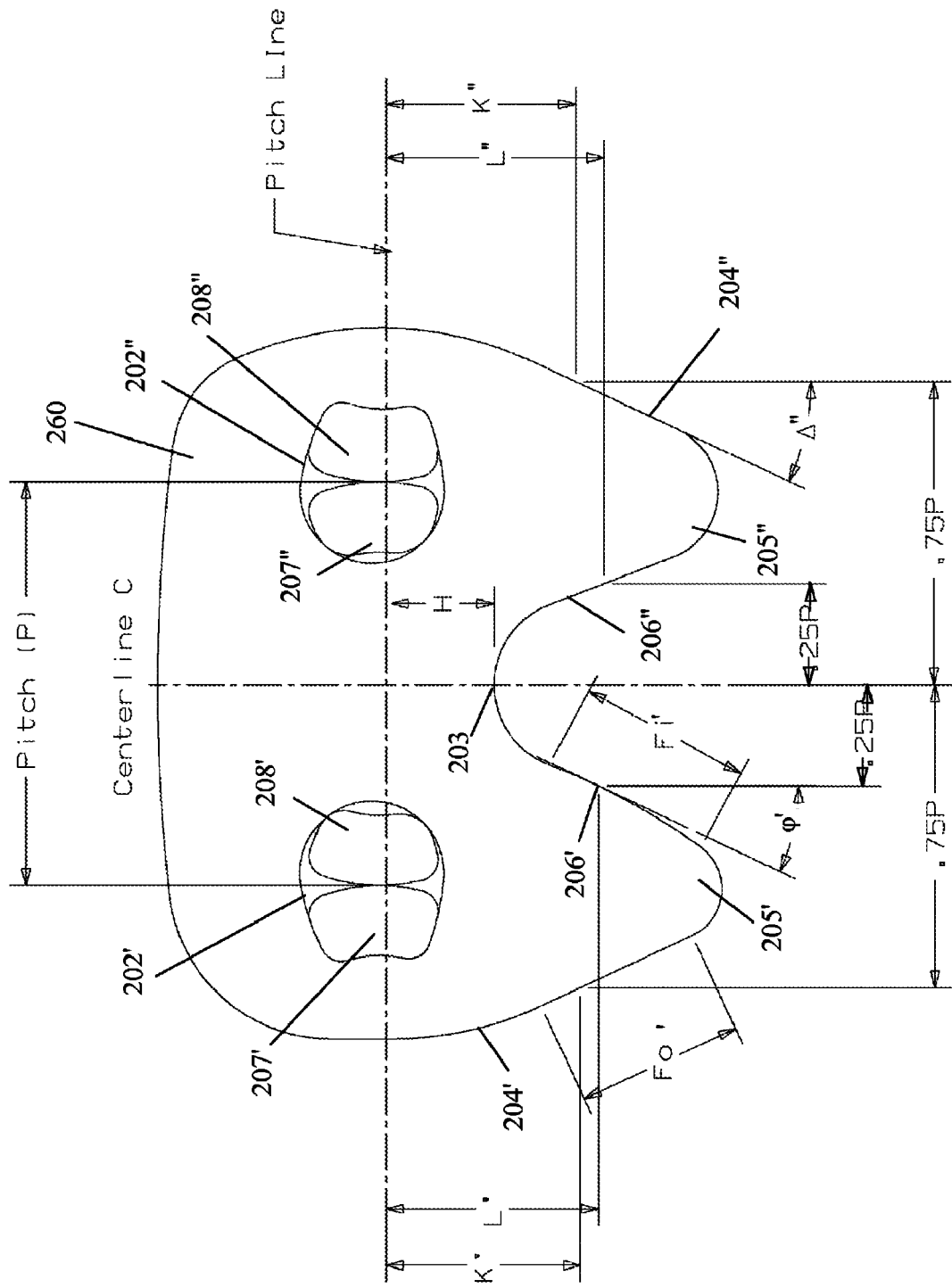
FIG. 9 shows a link of a seventh embodiment that is asymmetrical.

FIG. 9 shows an asymmetric link 260 of a seventh embodiment in which one half of the link, measured from the edge of the link to the centerline C, is different than the other half of the link, measured from centerline C to the opposite edge of the link. Link 260 drivingly contacts the sprocket teeth (not shown) on the inner flank 206" and seats on the sprocket teeth on the outer flank 204' of the link. The link 260 has pin apertures 202' and 202" on either side of the centerline C for receiving connecting pins comprised of a rocker pin 207", 207' and a second pin 208", 208'. Each half of the link 260 has a tooth 205", 205'. The teeth 205", 205' each have outside flanks 204", 204' and inside flanks 206", 206' that form the crotch 203 of the link. The pitch or pitch distance (P) of the link is the distance between the contact points of the rocker joints in an assembled chain. The pitch line is defined as a line passing through the pin and rocker contact points when the link is assembled in a chain that is in a straight line. Variables K' and K" are the measured distance between the pitch line and a line which contacts the outer flanks at 0.75*Pitch (0.75 P) from the centerline of the link.

The effective outer flank angle Δ', Δ" is defined as the angle formed by a line tangent to the outer flank 204", 204' of the link at the 0.75 P line and a vertical line intersecting the tangent line. The effective outer flank angle was shown on one side of the link only for clarity purposes.

Variable L' and L" show the measured distance between the pitch line and a line which contacts the inner flanks at 0.25*Pitch (0.25 P) from the link centerline. Variable H is the measured distance below the pitch line to the apex of the crotch 203 of the link. Variable T' and T" are the measured distance below the pitch line to the ends of the teeth of the links.

On the inner flanks 206", 206' of the link, Fi' Fi" shows the contact area on the inner link flank 206", 206' in which the link drivingly contacts the sprocket teeth. The effective inner flank angle $\phi'$, $\phi''$ is defined as the angle formed tangent to a radius, forming the inside flank 206", 206' and whose center is located outside the periphery of the link, at the contact point of the radius to a horizontal line spaced 0.25*P from a vertical centerline of the link 260. However, the effective inner flank angle $\phi''$, $\phi'$ may be defined as the angle formed by a line parallel to the inner flank and a vertical line passing through the 0.25 P contact point, if the inner flank is a straight line. Each half of the link may be further defined as described above and herein stated by reference by formulas 1.1, 1.2, 1.3, 1.4, 1.5, 2.1, 2.2, 2.3, 2.4, 2.5, 2.6 and 2.7. While only some of the angles or contact points are shown on one side of the asymmetric link versus the other side, due to clarity, it is to be understood that the same angle and contact area are present on the other side of the link as well.

The vertical line that intersects the tangent line, may be any vertical line in the above embodiments.

Links may be designed incorporating various features shown in FIGS. 3, 4, 5, 6, 7, 8, and 9 without departing from the spirit of the invention. They may also be altered to modify the driving contact with the sprocket to affect the timing of the engagements of the inner and outer flanks. The links of the present invention may be arranged along the chain randomly or in a prearranged pattern. The links of the present invention may also be used in a chain with standard links or a chain may be formed using links of only one embodiment throughout the chain.

A rocker joint comprising a second pin and a rocker pin may be received in the apertures of the links and used to connect the links to form a chain.

While 0.375 in pitch was used in examples in the application, the links are not limited to said pitch.

Example

In order to provide context for the examples below, an analysis of the average values for the corresponding ratios of prior art production chains are shown in Table 1 below.

TABLE 1

| Link Properties and Ratios | Average Prior Art Values |
|---|---|
| Outer Effective Flank Angle | 30.2 degrees |
| $\dfrac{K}{P}$ | 0.4062 |
| $\dfrac{K}{P \times (\tan\Delta)}$ | 0.6983 |
| Inner Effective Flank Angle | 31.03 degrees |
| $\dfrac{H}{P}$ | 0.1991 |
| $\dfrac{T}{P}$ | 0.7357 |
| $\dfrac{L}{P}$ | 0.4657 |

TABLE 1-continued

| Link Properties and Ratios | Average Prior Art Values |
|---|---|
| $\dfrac{\left(\dfrac{K}{P} * \dfrac{H}{P}\right)}{\tan\Delta}$ | 0.1413 |
| $\dfrac{L}{P \times (\tan(\varphi))}$ | 0.7747 |
| $\left(\dfrac{T}{P} - \dfrac{H}{P}\right) \times \dfrac{H}{P}$ | 0.1043 |
| $\dfrac{\left(\left(\dfrac{T}{P} - \dfrac{H}{P}\right) * \dfrac{H}{P}\right)}{\tan(\varphi)}$ | 0.1847 |
| $\dfrac{T}{P \times (\tan(\varphi))}$ | 1.2259 |

One example of a chain of the present invention was compared with conventional chains in production; a rocker joint chain and a single round pin chain. The pitch or pitch distance P of the all of the chains tested were 0.4346 inch pitch. The effective inner flank angle $\phi$ of the present invention rocker joint chain was 28.5 degrees. The ratio of T, the distance from the pitch line through the apertures of the links to the toe of the link, to the pitch distance or pitch P of the present invention rocker joint chain was 0.8277. The ratio of L, the distance from the pitch line through the apertures to the 0.5 P line on the inside flank, to the product of the pitch distance or pitch P and the tangent of the effective inner flank angle $\phi$ present invention rocker joint chain was 0.9094.

The chains were tested to determine the torque required for the chain to jump teeth both dynamically and statically. To determine the tooth jump torque dynamically, each chain at a width of 1.25 inches was fitted to a transfer case and rotated at 150 rpm while the torque was slowly ramped up until the chain jumped teeth. Referring to the results in Table 2, the current production rocker joint chain requires the least amount of torque for the chain to begin jumping teeth. The current production round pin chain requires a greater amount of torque and increases the amount of torque required before a tooth jump occurs by 55%. The chain of the present invention requires a similar amount of torque as the round pin chain, and increases the amount of torque required before a tooth jump occurs by 54%. Furthermore, the current production rocker joint chain would have to increase the width of the chain to around two inches to obtain similar results to the present invention rocker joint chain.

TABLE 2

| Chain Type | Torque to jump teeth (ft-lbs) | % Improvement chain |
|---|---|---|
| Current Production Rocker Joint Chain | 2078 | 0% |
| Current Production Round Pin Chain | 3223 | 55% |
| Present Invention Rocker Joint Chain | 3199 | 54% |

To determine the tooth jump torque statically, each chain at a width of 1.00 inch was fitted to a special test machine where the output sprocket is grounded through a torque meter and the input sprocket is rotated slowly until the chain jumps teeth. Referring to the results in Table 3, the rocker joint chain requires the least amount of torque for the chain to begin jumping teeth. The round pin chain requires a greater amount of torque required before a tooth jump occurs by 43%. The chain of the present invention requires a similar amount of torque as the round pin chain, and increases the amount of torque required before a tooth jump occurs by 40%. Furthermore, the current production rocker joint chain would have to increase the width of the chain to around 1.5 inches to obtain similar results to the present invention rocker joint chain.

TABLE 3

| Chain Type | Trial 1 | Trial 2 |
|---|---|---|
| Current Production Rocker Joint Chain | 3110 ft-lbs | 3060 ft-lbs |
| Current Production Round Pin Chain | 4399 ft-lbs | 4504 ft-lbs |
| Present Invention Rocker Joint Chain | 4290 ft-lbs | 4333 ft-lbs |

Noise tests were also conducted on the chains as shown in Table 4. Each of the chains were run on 40 tooth sprockets in a hemi-anechoic chamber from 500 rpm to 3000 rpm under 40 ft.-lbs torque load. The noise was sampled across the speed range and a speed range average (SRA) was computed. The overall noise includes all of the frequencies recorded from 20 hertz to 20,000 hertz. The mesh frequency is the frequency at which the chain links engage the sprockets and two times the mesh frequency is twice that value. For the test conditions noted above, mesh frequency would vary from 333 Hz. at 500 rpm up to 2000 Hz. at 3000 rpm and twice mesh frequency would be 666 Hz. and 4000 Hz. at the same two speeds.

TABLE 4

| Chain Type | Mesh Frequency SRA, dBA | 2× Mesh Frequency SRA, dBA | Overall Noise SRA, dBA |
|---|---|---|---|
| Current Production Rocker Joint Chain | 58.2 | 51.3 | 77.2 |
| Current Production Round Pin Chain | 61.9 | 57.6 | 78.8 |
| Present Invention Rocker Joint Chain | 55.8 | 50.8 | 72.4 |

Figure 10:
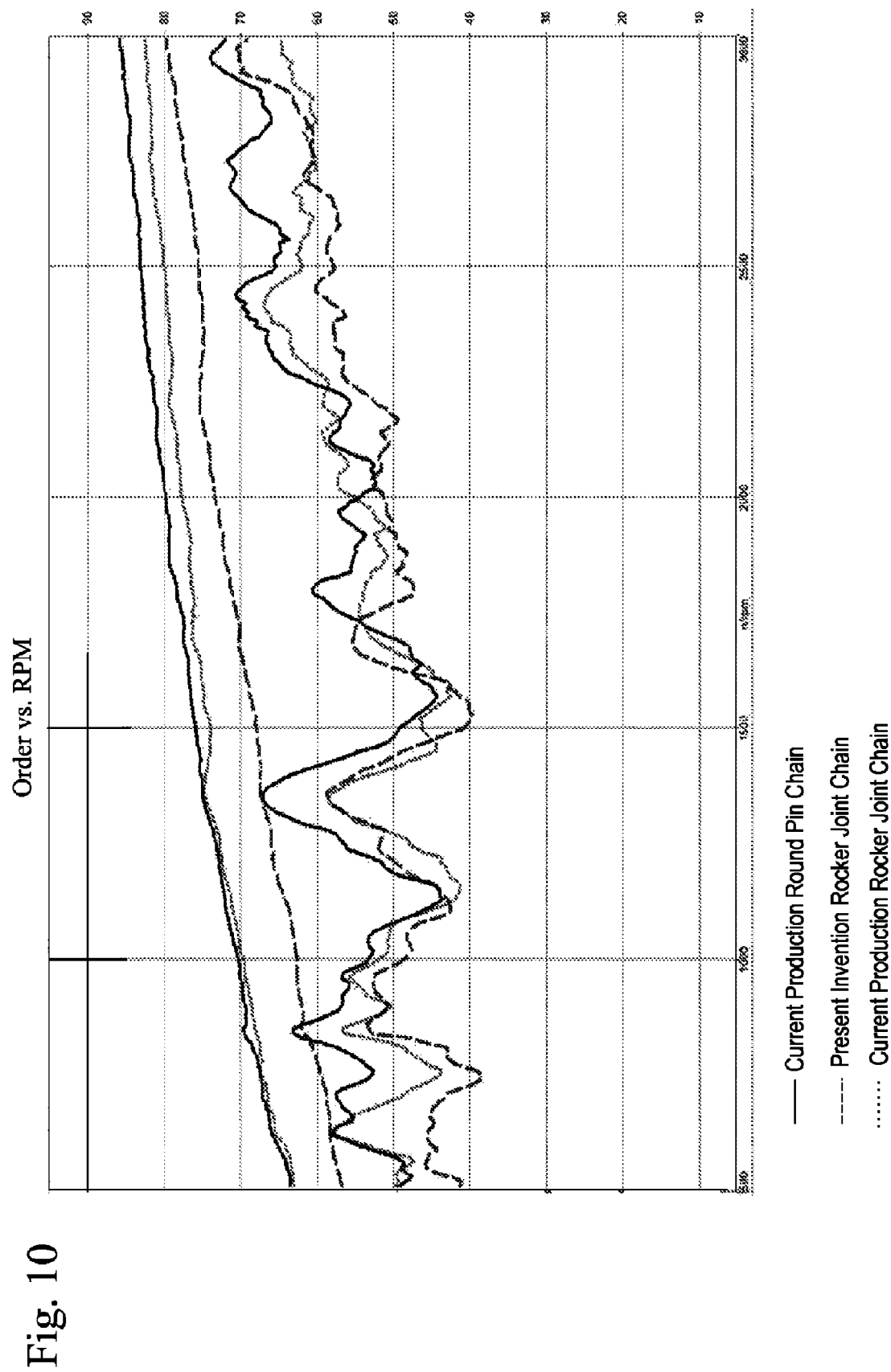
FIG. 10 is graph of order versus speed for a current production rocker joint chain, a current production round pin chain, and the present invention rocker joint chain at pitch or mesh frequency along with the overall noise generated by the chain drive.
Figure 11:
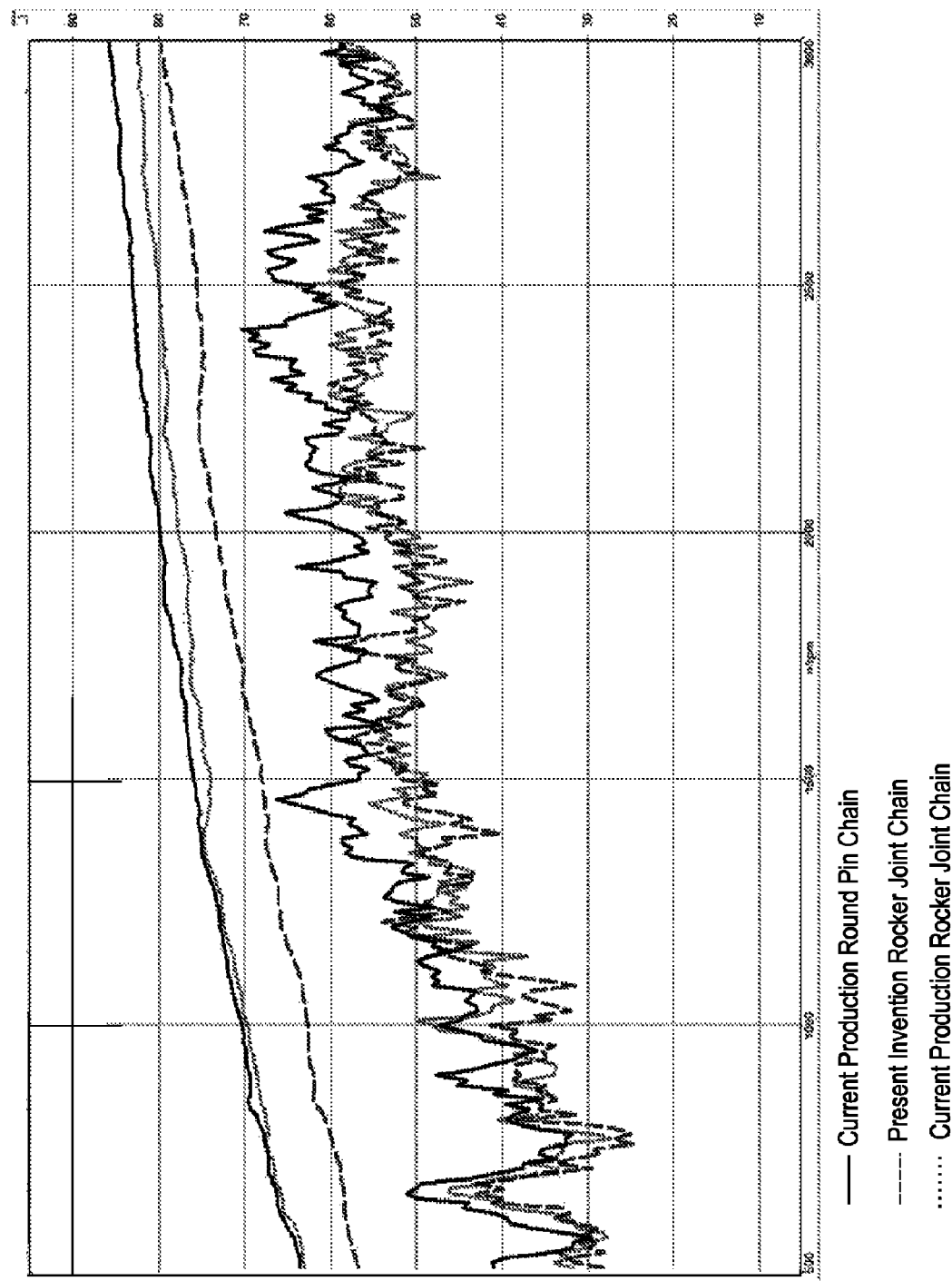
FIG. 11 is graph of noise versus speed for a current production rocker joint chain, a current production round pin chain, and the present invention rocker joint chain at 2 times the pitch or mesh frequency along with the overall noise generated by the chain drive.

FIGS. 10 and 11 are graphs of noise versus speed for the present invention rocker joint chain, the current production round pin chain, and the current production rocker joint chain at mesh frequency and 2 times the mesh frequency, respectively. Overall noise is also included in each of the graphs.

The results of the tests conducted show that the present invention rocker joint chain offers a tooth jump torque of 50% greater than the current production rocker joint chain and equal to that of the current production round pin chain. The present invention rocker joint chain is substantially quieter than that of the current production rocker joint chain and in a different class for noise in comparison to the current production round pin chain. It should be noted that a reduction in noise of 6 dBA is perceived as half as loud by the human ear. Lastly, the current production round pin chain is limited in speed in comparison to both the current production rocker joint chain and the present invention rocker joint chain, due to the greater friction within the joint of the chain from the links sliding on the pins.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A link for a chain for use with a sprocket, the link comprising a body having a pair of apertures for receiving connecting pins comprising a pin and a rocker pin, the apertures being spaced apart by a pitch distance, and having a pitch line passing through the apertures; and a pair of teeth having outside flanks, and inside flanks between the teeth defining a crotch, the link being formed to drivingly contact sprocket teeth of the sprocket on the inner flanks of the link; wherein the improvement comprises:
   a) a ratio of a distance between the pitch line and a line which is parallel to the pitch line and contacts both of the inner flanks at a location where the distance between each contact point is 0.5 times the pitch distance to a product of the pitch distance and the tangent of an effective inner flank angle between a line tangent to the inner flank of the link at a distance 0.25 times the pitch line length from the vertical centerline of the link and a vertical line intersecting the tangent line, is greater than or equal to 0.850; and
   b) a ratio of a distance from the pitch line to ends of the teeth to a product of the pitch distance and the tangent of the effective inner flank angle between a line tangent to the inner flank of the link at 0.25 times the pitch line from the vertical centerline of the link and a vertical line intersecting the tangent line, is greater than or equal to 1.4.

2. The link of claim 1, wherein a ratio of a distance from the pitch line to ends of the teeth to the pitch distance of the chain, is greater than or equal to 0.770.

3. The link of claim 1, wherein the effective inner flank angle is less than or equal to 29 degrees.

4. The link of claim 1, wherein a ratio of a distance between the pitch line and a line which contacts the outer flanks at 1.5 times pitch distance to a product of pitch distance and the tangent of an effective outer flank angle between a line tangent to the outer flank of the link at 0.75 times the pitch line from the vertical centerline of the link and a vertical line intersecting the tangent line, is greater than or equal to 0.790.

5. The link of claim 1, further comprising an effective outer flank angle between a line tangent to the outer flank of the link at 0.75 times the pitch line from the vertical centerline of the link and a vertical line intersecting the tangent line is less than or equal to 29 degrees.

6. The link of claim 1, wherein a difference between a ratio of a distance from the pitch line to ends of the teeth to the pitch distance of the chain and a ratio of a distance from the pitch line to an apex of the crotch, to the pitch distance of the chain, times the ratio of a distance from the pitch line to an apex of the crotch, to the pitch distance of the chain is greater than 0.124.

7. The link of claim 1, wherein a product of a ratio of a distance between the pitch line and a line which contacts the outer flanks at 1.5 times pitch distance to the pitch distance and a ratio of a distance below the pitch line to an apex of the crotch to the pitch distance, the product divided by the tangent of an effective outer flank angle between a line tangent to the outer flank of the link at 0.75 times pitch line from the vertical centerline of the line and vertical line intersecting the tangent line, is greater than 0.176.

8. A chain comprising a plurality of links as defined by claim 1 connected by a plurality of pins.

9. The link of claim 1, wherein the product of the ratio of a distance below the pitch line to an apex of the crotch to a pitch divided by the tangent of the effective inner flank angle times a difference between the ratio of a distance below the pitch line to the ends of the teeth to the pitch and a ratio of a distance below the pitch line to the apex of the crotch to the pitch is greater than 0.210.

10. A link for a chain for use with a sprocket, the link comprising a body having a pair of apertures for receiving connecting pins comprising a pin and a rocker pin, the apertures being spaced apart by a pitch distance, and having a pitch line passing through the apertures; and a pair of teeth having outside flanks, and inside flanks between the teeth defining a crotch, the link being formed to drivingly contact sprocket teeth of the sprocket on the inner flanks of the link; wherein the improvement comprises:
   a) an effective inner flank angle between a line length tangent to the inner flank of the link at a distance 0.25 times the pitch line from the vertical centerline of the link and a vertical line intersecting the tangent line is less than or equal to 29 degrees;
   b) a ratio of a distance between the pitch line and a line which is parallel to the pitch line and contacts both of the inner flanks at a location where the distance between each contact point is 0.5 times the pitch distance to a product of the pitch distance and the tangent of the effective inner flank angle, is greater than or equal to 0.850; and
   c) a ratio of a distance between the pitch line and ends of the teeth to a product of the pitch distance and the tangent of the effective inner flank angle, is greater than or equal to 1.4.

11. The link of claim 10, wherein a ratio of a distance from the pitch line to ends of the teeth to the pitch distance of the chain, is greater than or equal to 0.770.

12. The link of claim 10, wherein a ratio of a distance between the pitch line and a line which contacts the outer flanks at 1.5 times pitch distance to a product of pitch distance and the tangent of an effective outer flank angle between a line tangent to the outer flank of the link at 0.75 times the pitch line from the vertical centerline of the link and a vertical line intersecting the tangent line, is greater than or equal to 0.790.

13. The link of claim 10, further comprising an effective outer flank angle between a line tangent to the outer flank of the link at 0.75 times the pitch line from the vertical centerline of the link and a vertical line intersecting the tangent line is less than or equal to 29 degrees.

14. The link of claim 10, wherein a difference between a ratio of a distance from the pitch line to ends of the teeth to the pitch distance of the chain and a ratio of a distance from the pitch line to an apex of the crotch, to the pitch distance of the chain, times the ratio of a distance from the pitch line to an apex of the crotch, to the pitch distance of the chain is greater than 0.124.

15. The link of claim 10, wherein a product of a ratio of a distance between the pitch line and a line which contacts the outer flanks at 1.5 times pitch distance to the pitch distance and a ratio of a distance below the pitch line to an apex of the crotch to the pitch distance, the product divided by the tangent of an effective outer flank angle between a line tangent to the outer flank of the link at 0.75 times pitch line from the vertical centerline of the line and vertical line intersecting the tangent line, is greater than 0.176.

16. A chain comprising a plurality of links as defined by claim 10 connected by a plurality of pins.

17. The link of claim 10, wherein the product of the ratio of a distance below the pitch line to an apex of the crotch to a pitch divided by the tangent of the effective inner flank angle times a difference between the ratio of a distance below the pitch line to the ends of the teeth to the pitch and a ratio of a distance below the pitch line to the apex of the crotch to the pitch is greater than 0.210.

18. A link for a chain for use with a sprocket, the link comprising a body having a pair of apertures for receiving connecting pins comprising a pin and a rocker pin, the apertures being spaced apart by a pitch distance, and having a pitch line passing through the apertures; and a pair of teeth having outside flanks, and inside flanks between the teeth defining a crotch, the link being formed to drivingly contact sprocket teeth of the sprocket on the inner flanks of the link; wherein the improvement comprises:
   a) a difference between a ratio of a distance from the pitch line to ends of the teeth to the pitch distance of the chain and a ratio of a distance from the pitch line to an apex of the crotch, to the pitch distance of the chain times the ratio of a distance from the pitch line to an apex of the crotch, to the pitch distance of the chain is greater than 0.124; and
   b) an effective inner flank angle between a line tangent to the inner flank of the link at a distance 0.25 times the pitch line length from the vertical centerline of the link and a vertical line intersecting the tangent line is less than or equal to 29 degrees.

19. The link of claim 18, wherein a ratio of a distance from the pitch line to ends of the teeth to the pitch distance of the chain, is greater than or equal to 0.770.

20. The link of claim 18, wherein a ratio of a distance between the pitch line and a line which contacts the outer flanks at 1.5 times pitch distance to a product of pitch distance and the tangent of an effective outer flank angle between a line tangent to the outer flank of the link at 0.75 times the pitch line from the vertical centerline of the link and a vertical line intersecting the tangent line, is greater than or equal to 0.790.

21. The link of claim 18, further comprising an effective outer flank angle between a line tangent to the outer flank of the link at 0.75 times the pitch line from the vertical centerline of the link and a vertical line intersecting the tangent line is less than or equal to 29 degrees.

22. The link of claim 18, wherein:
   a) a ratio of a distance between the pitch line and a line which is parallel to the pitch line and contacts both of the inner flanks at a location where the distance between each contact point is 0.5 times pitch distance to a product of the pitch distance and the tangent of an effective inner flank angle between a line tangent to the inner flank of the link at a distance 0.25 times the pitch line length from the vertical centerline of the link and a vertical line intersecting the tangent line, is greater than or equal to 0.850; and
   b) a ratio of a distance from the pitch line to ends of the teeth to a product of the pitch distance and the tangent of the effective inner flank angle between a line tangent to the inner flank of the link at 0.25 times the pitch line from the vertical centerline of the link and a vertical line intersecting the tangent line, is greater than or equal to 1.4.

23. The link of claim 18, wherein a product of a ratio of a distance between the pitch line and a line which contacts the outer flanks at 1.5 times pitch distance to the pitch distance and a ratio of a distance below the pitch line to an apex of the crotch to the pitch distance, the product divided by the tangent of an effective outer flank angle between a line tangent to the outer flank of the link at 0.75 times pitch line from the vertical centerline of the line and vertical line intersecting the tangent line, is greater than 0.176.

24. A chain comprising a plurality of links as defined by claim 18 connected by a plurality of pins.

25. The link of claim 18, wherein the product of the ratio of a distance below the pitch line to the apex of the crotch to a pitch divided by the tangent of the effective inner flank angle times a difference between the ratio of a distance below the pitch line to the ends of the teeth to the pitch and a ratio of a distance below the pitch line to the apex of the crotch to the pitch is greater than 0.210.

26. A link for a chain for use with a sprocket, the link comprising a body having a pair of apertures for receiving connecting pins comprising a pin and a rocker pin, the apertures being spaced apart by a pitch distance, and having a pitch line passing through the apertures; and a pair of teeth having outside flanks, and inside flanks between the teeth defining a crotch, the link being formed to drivingly contact sprocket teeth of the sprocket on the inner flanks of the link; wherein the improvement comprises:
   a) an effective inner flank angle between a line tangent to the inner flank of the link at a distance 0.25 times the pitch line length from the vertical centerline of the link and a vertical line intersecting the tangent line is less than or equal to 29 degrees;
   b) a ratio of a distance between the pitch line and a line which is parallel to the pitch line and contacts both of the inner flanks at a location where the distance between each contact point is 0.5 times the pitch distance to a product of the pitch distance and the tangent of the effective inner flank angle, is greater than or equal to 0.850;
   c) a ratio of a distance between the pitch line and ends of the teeth to a product of the pitch distance and the tangent of the effective inner flank angle, is greater than or equal to 1.4;
   d) a difference between a ratio of a distance from the pitch line to ends of the teeth to the pitch distance of the chain and a ratio of a distance from the pitch line to an apex of the crotch, to the pitch distance of the chain times the ratio of a distance from the pitch line to an apex of the crotch, to the pitch distance of the chain is greater than 0.124; and
   e) a ratio of a distance from the pitch line to ends of the teeth to the pitch distance of the chain, is greater than or equal to 0.770.

27. The link of claim 26, wherein a ratio of a distance between the pitch line and a line which contacts the outer flanks at 1.5 times pitch distance to a product of pitch distance and the tangent of an effective outer flank angle between a line tangent to the outer flank of the link at 0.75 times the pitch line from the vertical centerline of the link and a vertical line intersecting the tangent line, is greater than or equal to 0.790.

28. The link of claim 26, further comprising an effective outer flank angle between a line tangent to the outer flank of the link at 0.75 times the pitch line from the vertical centerline of the link and a vertical line intersecting the tangent line is less than or equal to 29 degrees.

29. The link of claim 26, wherein a product of a ratio of a distance between the pitch line and a line which contacts the outer flanks at 1.5 times pitch distance to the pitch distance and a ratio of a distance below the pitch line to an apex of the crotch to the pitch distance, the product divided by the tangent of an effective outer flank angle between a line tangent to the outer flank of the link at 0.75 times pitch line from the vertical centerline of the line and vertical line intersecting the tangent line, is greater than 0.176.

30. A chain comprising a plurality of links as defined by claim 26 connected by a plurality of pins.

31. The link of claim 26, wherein the product of the ratio of a distance below the pitch line to the apex of the crotch to a pitch divided by the tangent of the effective inner flank angle times a difference between the ratio of a distance below the pitch line to the ends of the teeth to the pitch and a ratio of a distance below the pitch line to the apex of the crotch to the pitch is greater than 0.210.

32. A link for a chain for use with a sprocket, the link comprising a body having a pair of apertures for receiving connecting pins comprising a pin and a rocker pin, the apertures being spaced apart by a pitch distance, and having a pitch line passing through the apertures; and a pair of teeth having outside flanks, and inside flanks between the teeth defining a crotch, the link being formed to drivingly contact sprocket teeth of the sprocket on the inner and outer flanks of the link; wherein the improvement comprises:
   a) a ratio of a distance between the pitch line and a line which is parallel to the pitch line and contacts both of the inner flanks at a location where the distance between each contact point is 0.5 times the pitch distance to a product of the pitch distance and the tangent of an effective inner flank angle between a line tangent to the inner flank of the link at a distance 0.25 times the pitch line length from the vertical centerline of the link and a vertical line intersecting the tangent line, is greater than or equal to 0.850; and
   b) a ratio of a distance from the pitch line to ends of the teeth to a product of the pitch distance and the tangent of the effective inner flank angle between a line tangent to the inner flank of the link at 0.25 times the pitch line from the vertical centerline of the link and a vertical line intersecting the tangent line, is greater than or equal to 1.4.

33. The link of claim 32, wherein a ratio of a distance from the pitch line to ends of the teeth to the pitch distance of the chain, is greater than or equal to 0.770.

34. The link of claim 32, wherein the effective inner flank angle is less than or equal to 29 degrees.

35. The link of claim 32, wherein a ratio of a distance between the pitch line and a line which contacts the outer flanks at 1.5 times pitch distance to a product of pitch distance and the tangent of an effective outer flank angle between a line tangent to the outer flank of the link at 0.75 times the pitch line from the vertical centerline of the link and a vertical line intersecting the tangent line, is greater than or equal to 0.790.

36. The link of claim 32, wherein a difference between a ratio of a distance from the pitch line to ends of the teeth to the pitch distance of the chain and a ratio of a distance from the pitch line to an apex of the crotch, to the pitch distance of the chain times the ratio of a distance from the pitch line to an apex of the crotch, to the pitch distance of the chain is greater than 0.124.

37. The link of claim 32, wherein a product of a ratio of a distance between the pitch line and a line which contacts the outer flanks at 1.5 times pitch distance to the pitch distance and a ratio of a distance below the pitch line to an apex of the crotch to the pitch distance, the product divided by the tangent of an effective outer flank angle between a line tangent to the outer flank of the link at 0.75 times pitch line from the vertical centerline of the line and vertical line intersecting the tangent line, is greater than 0.176.

38. The link of claim 32, further comprising an effective outer flank angle between a line tangent to the outer flank of the link at 0.75 times the pitch line from the vertical centerline of the link and a vertical line intersecting the tangent line is less than or equal to 29 degrees.

39. A chain comprising a plurality of links as defined by claim 32 connected by a plurality of pins.

40. The link of claim 32, wherein the product of the ratio of a distance below the pitch line to an apex of the crotch to a pitch divided by the tangent of the effective inner flank angle times a difference between the ratio of a distance below the pitch line to the ends of the teeth to the pitch and a ratio of a distance below the pitch line to the apex of the crotch to the pitch is greater than 0.210.

41. A link for a chain for use with a sprocket, the link comprising a body having a pair of apertures for receiving connecting pins comprising a pin and a rocker pin, the apertures being spaced apart by a pitch distance, and having a pitch line passing through the apertures; and a pair of teeth having outside flanks, and inside flanks between the teeth defining a crotch, the link being formed to drivingly contact sprocket teeth of the sprocket on the inner flanks of the link; wherein the improvement comprises:
   a) an effective inner flank angle between a line tangent to the inner flank of the link at a distance 0.25 times the pitch line length from the vertical centerline of the link and a vertical line intersecting the tangent line is less than or equal to 29 degrees;
   b) a product of a ratio of a distance below the pitch line to an apex of the crotch to a pitch divided by the tangent of the effective inner flank angle times a difference between the ratio of a distance below the pitch line to the ends of the teeth to the pitch and a ratio of a distance below the pitch line to the apex of the crotch to the pitch is greater than 0.210.

* * * * *